US008228757B2

(12) United States Patent
Beffa et al.

(10) Patent No.: US 8,228,757 B2
(45) Date of Patent: Jul. 24, 2012

(54) SYNCHRONIZATION OF MODULES IN A WIRELESS ARRAY

(75) Inventors: Mihai Beffa, Cupertino, CA (US); Calvin Day, Lake Jackson, TX (US); Kevin Rose, Santa Fe, NM (US); Steven Kooper, Richmond, TX (US); Keith Elder, Richmond, TX (US)

(73) Assignee: Wireless Seismic, Inc., Louisville, CO (US)

( * ) Notice: Subject to any disclaimer, the term of this patent is extended or adjusted under 35 U.S.C. 154(b) by 262 days.

(21) Appl. No.: 12/651,091

(22) Filed: Dec. 31, 2009

(65) Prior Publication Data

US 2011/0158047 A1 Jun. 30, 2011

(51) Int. Cl.
*G01V 1/00* (2006.01)
(52) U.S. Cl. .......................................... 367/50; 367/55
(58) Field of Classification Search .................. 367/40, 367/50, 55, 76, 79; 702/17
See application file for complete search history.

(56) References Cited

U.S. PATENT DOCUMENTS

| 6,253,156 | B1 | 6/2001 | Bui-Tran et al. | |
|---|---|---|---|---|
| 7,583,560 | B2 * | 9/2009 | Chamberlain et al. | 367/76 |
| 7,660,201 | B2 * | 2/2010 | Fleure et al. | 367/50 |
| 2005/0035875 | A1 | 2/2005 | Hall et al. | |
| 2008/0049554 | A1 | 2/2008 | Crice et al. | |
| 2008/0170469 | A1 * | 7/2008 | Phillips et al. | 367/76 |
| 2011/0032798 | A1 * | 2/2011 | Ray et al. | 367/50 |

OTHER PUBLICATIONS

PCT/US2010/062494 Search Report and Written Opinion from the International Searching Authority, Sep. 21, 2011, 11 pages.

* cited by examiner

*Primary Examiner* — Mark Hellner
(74) *Attorney, Agent, or Firm* — Marsh Fischmann & Breyfogle LLP

(57) ABSTRACT

Presented are systems and methods for wireless data acquisition. The wireless data acquisition may involve synchronizing modules within a data acquisition array. The synchronized data acquisition array may be used to facilitate a seismic survey. Synchronization may be facilitated by receipt of a reference time event such that a clock is synchronized based on the reference time event.

17 Claims, 7 Drawing Sheets

SYNCHRONIZATION OF MODULES IN A WIRELESS ARRAY

FIELD

This invention relates to wireless data acquisition systems, specifically to wireless data acquisition systems with synchronization of timing systems between wireless modules communicating in a wireless data transfer network.

BACKGROUND

Seismic surveys are often used by natural resource exploration companies and other entities to create images of subsurface geologic structure. These images are used to determine the optimum places to drill for oil and gas and to plan and monitor enhanced resource recovery programs, among other applications. Seismic surveys may also be used in a variety of contexts outside of oil exploration such as, for example, locating subterranean water and planning road construction.

A seismic survey is normally conducted by placing an array of vibration sensors (accelerometers or velocity sensors called "geophones") on the ground, typically in a line or in a grid of rectangular or other geometry. Vibrations are created either by explosives or a mechanical device such as a vibrating energy source or a weight drop. Multiple energy sources may be used for some surveys. Additionally, in many surveys the vibrations are created at regular intervals. Moreover, the energy source may be moved to various locations between the vibration events during a seismic survey. The vibrations from the energy source propagate through the earth, taking various paths, refracting and reflecting from discontinuities or "events" in the subsurface, and are detected by the array of vibration sensors. Signals from the sensors are amplified and digitized, either by separate electronics or internally in the case of "digital" sensors. The survey may also be performed passively by recording vibrations in the earth from natural or man made activities.

The digital data from a multiplicity of sensors is eventually recorded on storage media, for example magnetic tape, or magnetic or optical disks, or other memory device, along with related information pertaining to the survey and the energy source. The energy source and/or the active sensors are relocated and the process continued until a multiplicity of seismic records is obtained to comprise a seismic survey. Data from the survey are processed on computers to create the desired information about subsurface geologic structure. Due to differences in propagation time associated with different geophone locations, these processes may involve correlating information received at different geophones such that the data is integrated for better event identification.

In general, as more sensors are used, placed closer together, and/or cover a wider area, the quality of the resulting image will improve. It has become common to use thousands of sensors in a seismic survey stretching over an area measured in square kilometers. Hundreds of kilometers of cables may be laid on the ground and used to connect these sensors. Large numbers of workers, motor vehicles, and helicopters are typically used to deploy and retrieve these cables. Exploration companies would generally prefer to conduct surveys with more sensors located closer together. However, additional sensors require even more cables and further raise the cost of the survey. Economic tradeoffs between the cost of the survey and the number of sensors generally demand compromises in the quality of the survey.

In addition to the logistic costs, cables create reliability problems. Besides normal wear-and-tear from handling, they are often damaged by animals, vehicles, lightning strikes, and other problems. Considerable field time is expended troubleshooting cable problems. The extra logistics effort also adds to the environmental impact of the survey, which, among other things, adds to the cost of a survey or eliminates surveys in some environmentally sensitive areas.

In response to the challenges presented with wired seismic arrays, approaches have been proposed using wireless technologies. For instance, some wireless systems employ a method where digitized data is stored temporarily in a local memory at or near the sensor location. Because the data is not visible to the survey crew, this is often called the "blind read out" method. In these blind read out systems, the seismic data acquired is manually read out from each module once all the seismic data has been gathered. However, such blind read out systems are undesirable, for some survey applications, as any modifications or other problems may not be detected until completion of a survey process. Systems that employ substantially real-time wireless read out have been proposed. One such system is described in U.S. patent application Ser. No. 11/538,744 filed on Oct. 4, 2006 and assigned to Wireless Seismic, Inc., which is hereby incorporated by reference in its entirety. In this system, a wireless read out of an array is accomplished by way of a serial transfer of data between a series of wireless modules. In this regard, a large quantity of data may be automatically retrieved over the serial transfer path between the modules.

SUMMARY

The present invention provides systems and methods for synchronizing wireless modules. The timing system of a wireless module is critical for the operation of the wireless module in a system employing more than one wireless module. Among the challenges addressed by precision timing and synchronization of modules include the ability to maximize the available bandwidth for data transfer and improve the correlation of data gathered from various modules.

Precise synchronization between modules allows for increased utilization of available bandwidth between modules. Serial data transfer between modules involves periods of transmission and reception between two or more modules in an array. If modules talk (e.g. transmit) or listen (e.g. receive) at the wrong time, cross-talk and interference may interfere with the serial data transfer. Accordingly, blanking intervals between transmission and reception timeslots may be provided to prevent potential cross talk problems. However, during these blanking intervals no data is transferred. In turn, the bandwidth available for data transfer is reduced because no data transmission occurs during the blanking intervals. It has been recognized that with improved synchronization, the periods of talking and listening may correlate more closely for different modules, thus leading to the ability to provide shorter, or potentially do away with blanking intervals. This, in turn, allows for increased utilization of bandwidth by synchronization of modules.

In one particular embodiment, the increased bandwidth availability of a wireless system may facilitate conducting an efficient seismic survey. As mentioned above, due to the nature of seismic data acquisition, vibration events may be created repetitively and in relatively rapid succession. Seismic data acquisition involves large amounts of data that must be delivered with each vibration event. In turn, higher bandwidth usage by way of synchronization of transmission and receiving periods for modules in the array allows for faster data delivery. As such, vibration events occurring during seismic surveys do not need to be slowed or delayed.

In addition, unlike systems that employ blind read outs, the present invention provides a system that allows for observation and monitoring of total and complete data delivered during acquisition. In blind read out systems, total and complete data can only be observed or monitored after the data is retrieved. Thus, there may be at least two undesirable outcomes. One undesirable outcome is encountered if there is a problem with a module or the system. In this case, the problem may not be detected until the data is retrieved in whole or in part. As such, blind read out systems may result in excess cost and time associated with repeating surveys. Another undesirable outcome is encountered when the delays, due directly to delays inherent in blind readout systems (e.g., delays associated with the manual delivery of data), cause the stake-holder to lose an opportunity to use the data in a timely manner. In contrast, the present system allows for real time or near real time delivery of data being acquired by the modules. In addition, data is delivered in a timely manner allowing stake-holders to take advantage of market conditions. As such, problems observed early in the survey may be resolved prior to the conclusion of the survey. Moreover, the present invention provides a system advantageous over blind read out systems in that it does not require personnel required to retrieve data from each module at the conclusion of the survey. Rather, data may be transmitted to a central processing station, obviating the need to manually retrieve data from the blind read out systems.

Additionally, the ability to correlate data is important in analyzing the resulting seismic data gathered during a survey. With more precise synchronization of modules, gathered data may have more accurate time information associated with it such that processes for interpreting the data may more closely correlate data from various modules. This results in higher resolution and fidelity of the resulting image.

As such, it is advantageous to accurately synchronize wireless modules in order to provide wireless modules that facilitate high speed data read outs in real time or near real time with high data synchronization to improve the correlation between the data gathered by the various modules in an array.

Moreover, while constant GPS time discipline allows for synchronization of modules, it is a less desirable means to continually synchronize modules in an array where the modules have a limited source of power. Each module in an array may be equipped with a GPS receiver. A part of the GPS signal received by each module may include data regarding a time used by GPS satellites. As such, each GPS receiver is capable of interpreting the signal, extracting the time data, and disciplining a clock to GPS time. However, such a system requires that the GPS receiver constantly be powered. The nature of wireless modules often requires batteries to power the modules. In this regard, the constant or frequent periodic use of a GPS receiver to discipline a module clock may lead to excessive power consumption having the undesired effect of limiting the operational life of the module, thus reducing the overall operational productivity of the system.

Accordingly, one object of the present invention is to enable a wireless system that employs high precision, distributed synchronization and includes high bandwidth utilization between modules by coordinating transmit and receive timeslots to minimize blanking intervals that result in dead time where no data transfer takes place. Yet another objective of the current invention is to enable synchronization between wireless modules in order to facilitate high data correlation. In this regard, data collected from different modules throughout an array may be analyzed and processed more accurately in order to achieve a more robust survey and higher resolution data outputs. The current invention also enables a wireless system to employ synchronization without the need for resource taxing synchronization methods employing constant receipt of time information.

Accordingly, a first aspect of the present invention involves a method for synchronizing a seismic data acquisition module in a wireless system. The method involves receiving a time reference event at the seismic data acquisition module. The method also includes recording or calculating a delay value. The delay value is then used to adjust the clock to synchronize the clock with the time reference event. The method may also involve instantaneous and time-managed clock adjustments based on the delay value.

A second aspect of the present invention includes a wireless data acquisition module for use in a seismic survey. The wireless data acquisition module according to this second aspect includes a clock for producing a timing signal. The timing signal has a phase and frequency. The wireless data acquisition module includes a transceiver that is operative to receive a time reference event. Additionally, the second aspect includes a controller that is operative to interpret the time reference event to calculate a compensation value. A clock adjustment module is provided that is operative to interpret the compensation value and modify the timing signal to be in synchronization with the time reference event.

Yet another aspect of the present invention involves a method for synchronizing wireless modules used for data delivery in a seismic data acquisition system. The method according to this third aspect of the invention includes providing an array comprising a plurality of seismic data acquisition modules that define a data transfer path. The method includes receiving synchronization information at one module from at least one other module of the plurality of seismic data acquisition modules. The method according to the third aspect of the present invention includes synchronizing a clock of the one module using the synchronization information. The delay value may then the added to the time reference event and compared to the clock to be synchronized. Based on the difference between the actual clock reading and the result of the time reference event, the clock may be adjusted such that the clock is in synchronization with the time reference event. The method of the third aspect includes establishing a timed delivery protocol implemented based on the synchronized clocks.

A fourth aspect of the present invention involves a method for correlating image information obtained by wireless modules in a seismic data acquisition system. The method according to this aspect includes providing a first wireless module and a second wireless module. Further, the method includes synchronizing the second wireless module to the first wireless module. The method also includes operating the first wireless module at a first time to obtain first image information and operating the second wireless module at a second time to obtain second image information. The method includes correlating first image information to second image information.

Variations and refinements may exist among any aspect presented herein. These variations and refinements may be made in any combination. For instance, the time reference event may, but need not, originate from another wireless data module. Moreover, the time reference event may originate from a base station or other module in the array. In this regard, the time reference event may be based on a known time value or be generated at a module employing constant discipline. Further, the delay value of the first aspect may include several components. By way of example, there may be processing delay and transmission delay associated with the time reference event.

Additionally, a timing signal may be used by the module for various module components and processes. For instance, the timing signal may coordinate the transmission and receiving periods of a module transceiver. Moreover, the timing signal may provide time information such that data gathered by the module may be time-stamped or otherwise appended with time information, either relative or temporal.

Also, any one of the modules in the array may receive synchronization information from any other module. Moreover, a module may receive synchronization information from a base station or other module capable of transmitting synchronization information.

DETAILED DESCRIPTION

Figure 1:
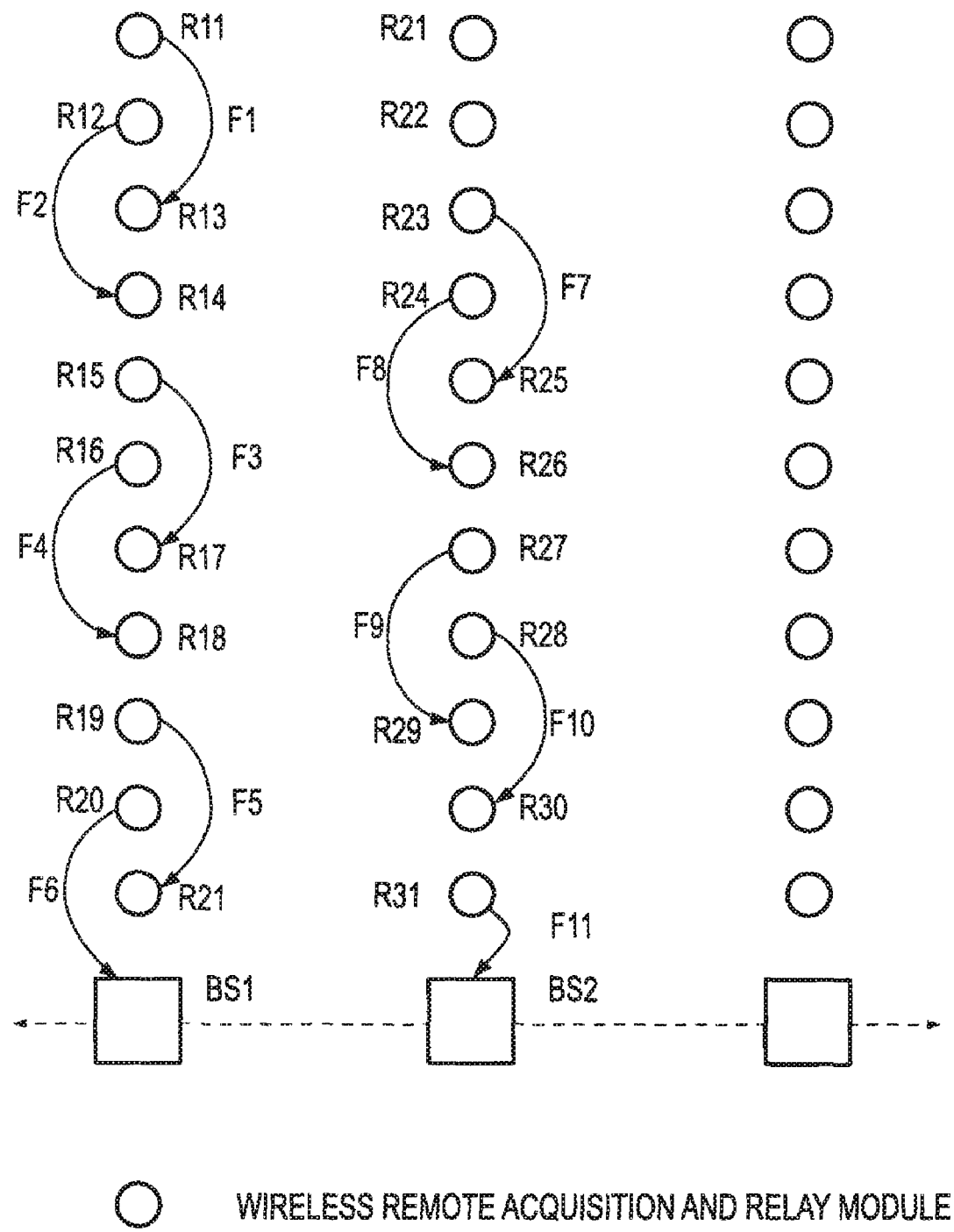
FIG. 1 is a schematic showing one embodiment of a wireless data acquisition array.

While the invention is susceptible to various modifications and alternative forms, specific embodiments thereof have been shown by way of example in the drawings and herein described in detail. It should be understood, however, that it is not intended to limit the invention to the particular form disclosed, but rather, the invention is to cover all modifications, equivalents, and alternatives falling within the scope of the invention as defined by the claims.

Figure 4:
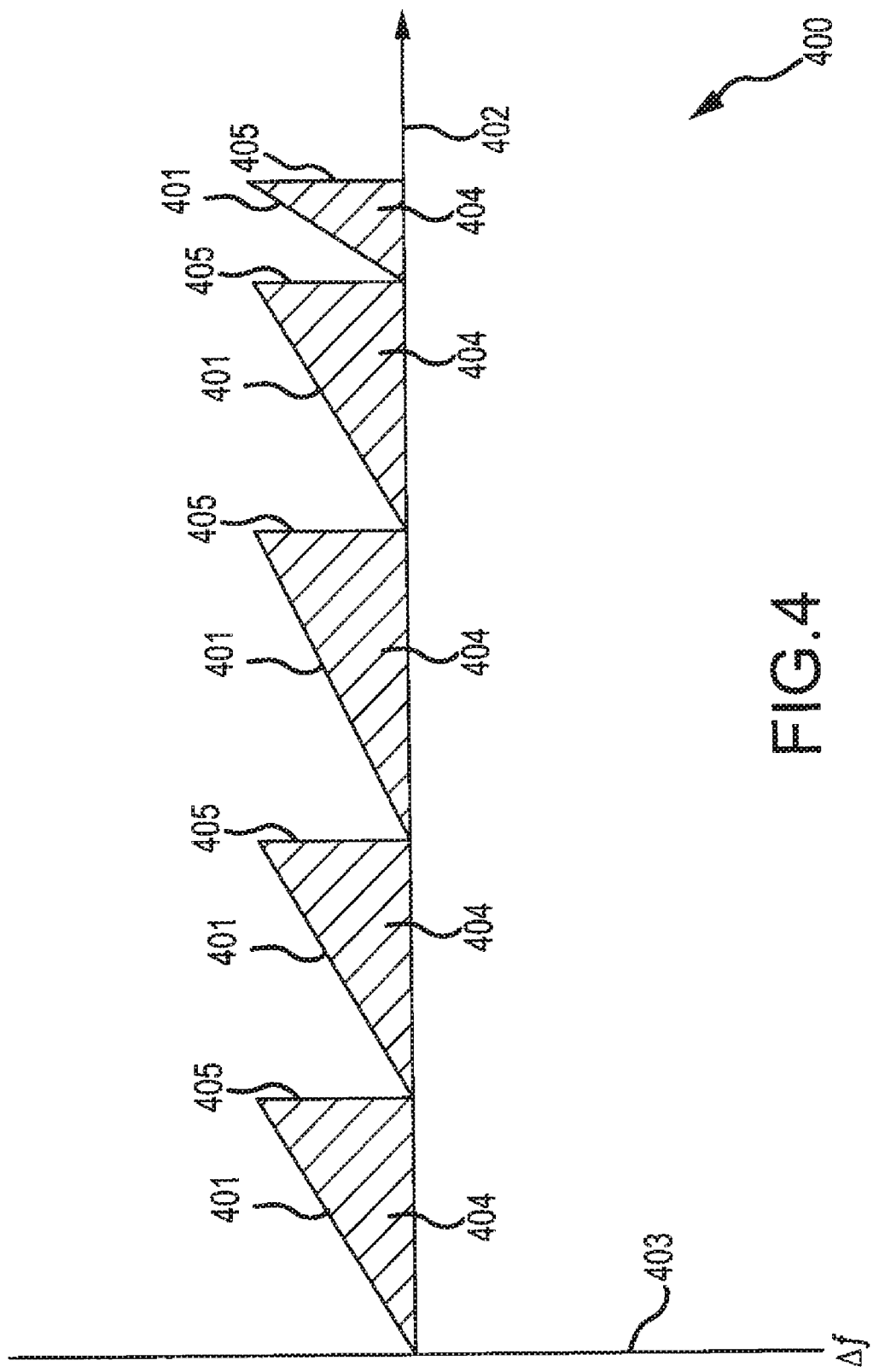
FIG. 4 is a graph showing one example of a difference in frequency in a module clock with respect to a reference time plotted over time.
Figure 5:
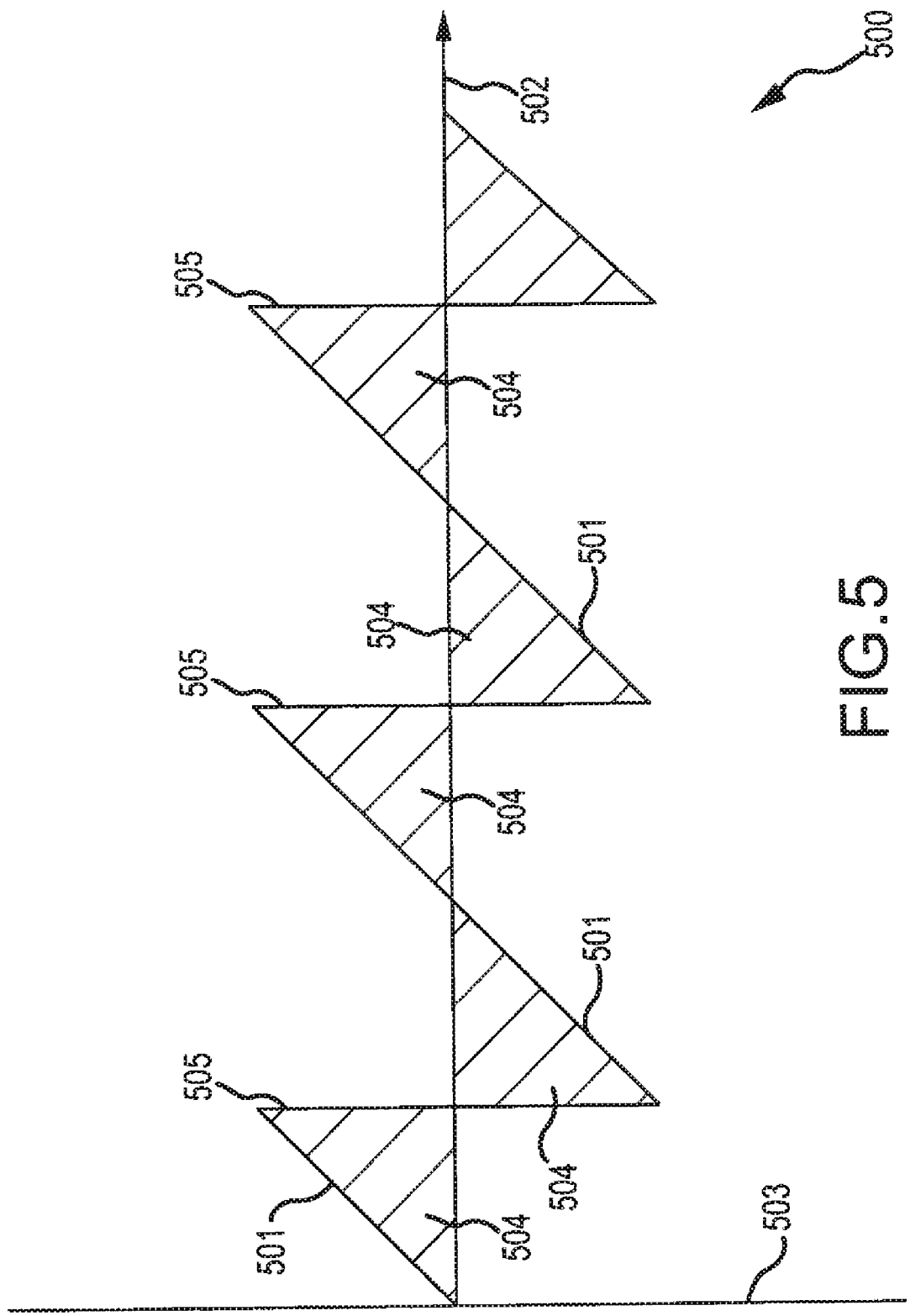
FIG. 5 is a graph showing another example of a difference in frequency in a module clock with respect to a reference time plotted over time.

In the following description, an overview of a wireless system enabled by the present invention is first described with reference to FIG. 1. Next, with further reference to FIG. 2, a discussion and description of various time multiplexing strategies are presented. Thereafter, in connection with FIGS. 4 and 5, depictions of the change in frequency between modules over time are described. Next, various processes including the design and implementation of a seismic survey enabled by the present invention are discussed with reference to FIGS. 6 and 7. Finally, an embodiment of a module including hardware to accomplish synchronization is presented and shown in FIG. 3.

FIG. 1 illustrates one embodiment of a wireless system that may employ time synchronization. The system depicted in FIG. 1 may be any system employing wireless communication between nodes or modules. These systems may be designed for a variety of purposes. Some examples include, but are not limited to wireless ad hoc networks, mesh networks, wireless data acquisition networks, or other wireless technologies.

In one embodiment, the system in FIG. 1 may be a wireless data acquisition system, such as a wireless data acquisition system employed to conduct a seismic survey. The system may comprise an array of modules and base stations. The base stations (BS1, BS2) and modules (R11-R31) may be arranged in such a manner that the modules (R11-R31) are arranged in a rectangular or other shaped geometrical array. In any regard, base station one BS1 and base station two BS2 may be in wireless communication with a plurality of wireless modules (R11-R31). Each wireless module (R11-R31) may have an internal clock. This clock may be used to append data with time stamps, provide logging information for the data, or coordinate components of the module. The wireless modules of FIG. 1 may be, but are not limited to, remote sensors, wireless access points, repeaters, journey management devices, or other nodes in a wireless system. In one embodiment, the wireless modules (R11-R31) may be geophone sensors of the kind used to conduct a seismic survey. These geophone sensors may be equipped with, among other things, digitizing circuitry, a microcontroller unit, and a transceiver.

The wireless modules (R11-R31) may transmit data wirelessly between the modules such that the data is transmitted or relayed to a base station (BS1, BS2). From the base station (BS1, BS2), the data may be further relayed to a central control and recording system (not shown). The wireless data acquisition system of FIG. 1 may require each wireless module to both transmit and receive data in order to establish a serial data transfer path among the modules.

By way of example, module R16 may, at a first instance be transmitting data to module R18. At another instance, module R16 may be receiving data from module R14. In this regard, data may be transmitted in a serial fashion from module to module in order to transmit data to one of the base stations (BS1, BS2). Once a communication path has been established, seismic data that has been collected at each of the modules may be transferred (or delivered) using the serial data path. This data delivery protocol may be used to communicate data from each of the modules to a base station and then on to a central processing station.

The communication between modules within the system or array in FIG. 1 may be accomplished by various techniques. However, it will be appreciated that an array, such as the one depicted in FIG. 1, may be susceptible to experiencing interference between the various modules in the absence of synchronization of the operation of the modules. Additionally, to facilitate the transport of a large quantity of data in a short period of time, it may be advantageous to employ multiplexing techniques for communications between the modules. Various time and frequency multiplexing techniques may be employed in order to facilitate transmission and reception of data at the wireless modules. These multiplexing techniques include, but are not limited to, time division multiplexing, frequency division multiplexing, code division multiplexing, or other techniques known in the art.

Figure 2A:
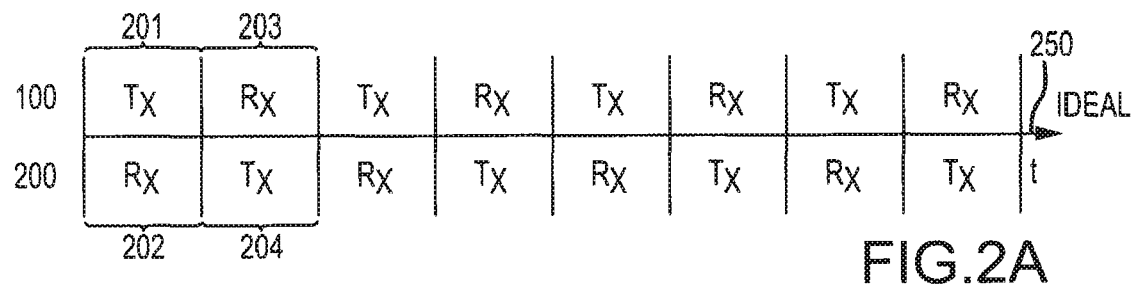
FIGS. 2A-2D are charts representing various operational states of two modules.

One embodiment of a time division multiplexing scheme (which may work in conjunction with other multiplexing schemes) is shown in FIG. 2A. FIG. 2 depicts various timeslots of either transmission (Tx) or reception (Rx) for a first module 100 and a second module 200. Time is represented along the axis 250. Above the axis 250 are graphical representations of discrete timeslots for transmission (Tx) and reception (Rx) for the first module 100. Similarly, below the axis 250 are graphical representations of discrete timeslots for transmission (Tx) and reception (Rx) for the second module 200.

Accordingly, in FIG. 2A, at a first timeslot 201, the first module 100 may be transmitting and the second module 200 is simultaneously receiving at timeslot 202. At a second time interval, the first module 100 is receiving at timeslot 203 while the second module 200 is transmitting at timeslot 204. This cycle of reception and transmission is repeated such that a communication path may be established among the wireless modules (100, 200). It should be appreciated that in FIG. 2A, the first module 100 and second module 200 do not experience a time wherein both modules are transmitting nor a time period wherein both modules are receiving. As such, interference between the first module and the second module during the transmission or reception may be reduced, even if the multiplexing arrangements (e.g., frequency division or code division multiplexing) are not employed with respect to the units under consideration.

In this regard, FIG. 2A represents an embodiment wherein the first module 100 and the second module 200 are synchronized. That is, an internal clock of the first module 100 is synchronized with an internal clock with module 200. As such, both modules may use internal clocks to define when to switch between transmission states and reception states. In the case where the clocks are synchronized, this switching may occur at the same time for both modules. In this regard, the bandwidth between the first module 100 and the second module 200 in FIG. 2A is maximized in that there is constant communication between the two modules.

Slight variations in the timeslots shown in FIG. 2A may lead to a situation wherein both modules are simultaneously transmitting or receiving. Such overlap in transmission or reception timeslots may lead to interference and other potential cross-talk problems. Additionally, the overlap in transmission or reception timeslots may reduce the bandwidth between the modules because, during periods of overlap, no data transfer occurs between the two modules.

Figure 2B:
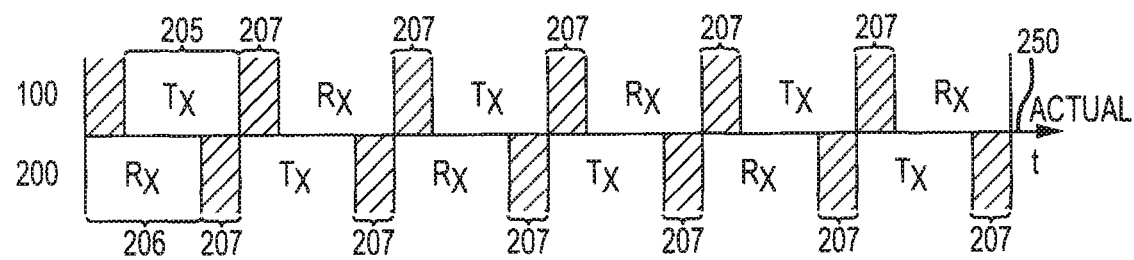
Figure 2C:
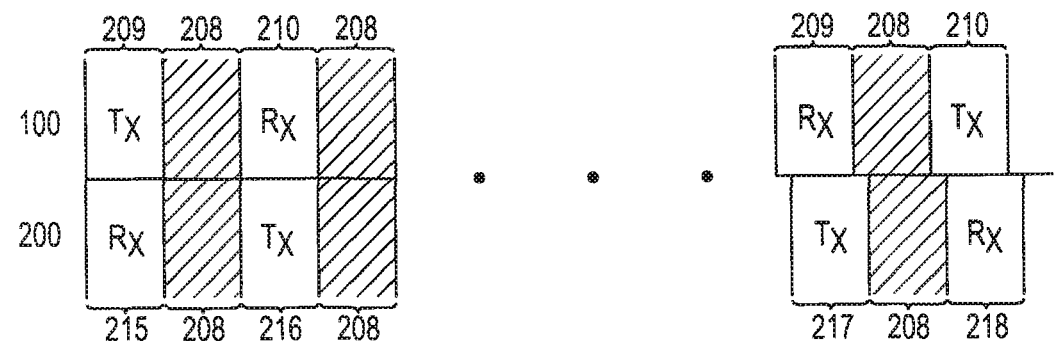

In order to accommodate for potential variations between the clocks of the first module 100 and the second module 200 and to avoid cross-talk problems, a second embodiment, as depicted in FIG. 2B, may be employed. A blanking interval 207 may be provided between each module's successive transmission timeslot and reception timeslot. During the blanking interval 207, the module is neither transmitting nor receiving. In other words, the blanking interval 207 is a quiet time where neither transmission nor reception occurs. The blanking interval 207 may allow for the first module 100 and second module 200 to be slightly out of phase from each other and still not experience cross-talk. That is, the second module 200 may begin its reception timeslot 206 prior to the first module 100 initiating its transmission timeslot 205. Similarly, module one 100 may continue to transmit 205 after the second module 200 has terminated its reception timeslot 206.

During the blanking interval 207, no data transfer takes place as there is no pairing between a transmitting and receiving module. In this regard, the blanking interval 207 may reduce cross-talk, but effectively lowers the available bandwidth because less time is available in which data may be transmitted and received. Furthermore, it can be appreciated that as the phase difference between the first module 100 and the second module 200 increases, a larger blanking interval 207 may be provided in order to prevent simultaneous reception or transmission. Again, however, it is to be noted that the larger the blanking interval 207, the more the bandwidth between the two modules is reduced. The lower the bandwidth, the slower the data delivery will be. As such, synchronization of the module clocks allows for reduced blanking intervals 207 such that the data transfer between the first module 100 and second module 200 approaches the arrangement in FIG. 2A, wherein bandwidth is maximized.

In addition to experiencing differences in phase of the clocks of the first module 100 and the second module 200, the clocks of the modules may experience frequency differences as well. With specific reference to FIG. 2C, a situation is shown where the clock frequency of the first module 100 and the clock frequency of the second module 200 are different. At a first times period, wherein the first module is transmitting 209 and the second module is receiving 215, the timeslots correspond and the length of the reception timeslot 215 and transmission timeslot 209 are equal. In this regard, the clocks of the two modules are, at least initially, in synch. This may continue for many cycles of transmission and reception. However, at a timeslot subsequent to 209/215, the first module 100 is receiving 209, while the second module continues to transmit 217 after the first module 100 has stopped receiving 209. This may result in an offset between transmission and reception timeslots due to the frequency offset between the two clocks. As such, the modules may be out of synch at subsequent timeslots (e.g., 209/217, 210/218, etc.). Again, blanking intervals 208 may be provided to prevent cross-talk and interference but also result in the undesired bandwidth limitations as discussed above.

Figure 2D:
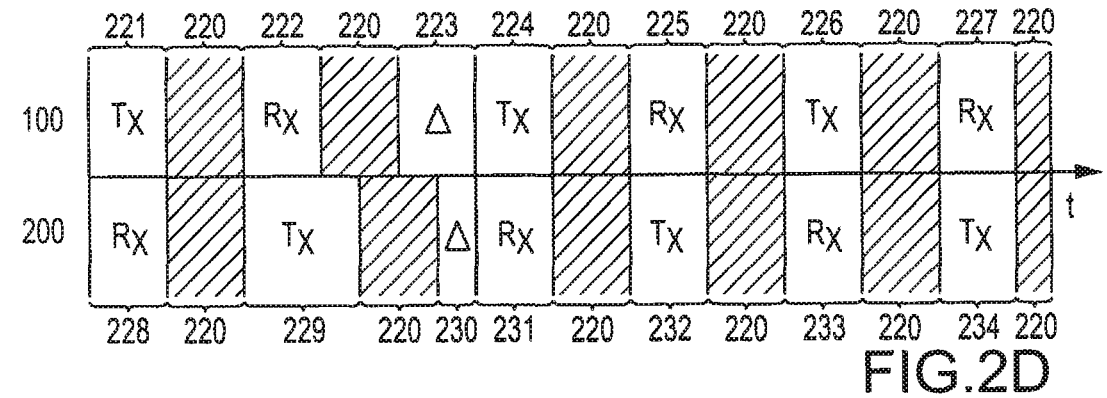

In yet another embodiment depicted in FIG. 2D, a first module 100 and a second module 200 may be transmitting and receiving in synchronization at a first timeslot 221/228. However, at a subsequent timeslot 222/229, the first module 100 and the second module 200 become unsynchronized. This may be due to a difference in frequency of the module clocks or a phase offset of the clocks. Irrespective of the cause of the offset, in FIG. 2D, at a third timeslot 223/230 a reference time event may occur. As such, the clock of the second unit 200 may be adjusted, as will be discussed further below. Accordingly, the first module 100 and the second module 200 may be synchronized after the reference time event 223/230. Additionally, reference time events may be generated multiple times to periodically discipline a second module 200 clock to a first module 100 clock. In this regard, the phase and frequency of the first module clock 100 and the second module clock 200 may be periodically synchronized, eliminating the need to provide large blanking intervals 220 between reception and transmission timeslots in the form of blanking intervals 207. As such, the data throughput may be increased between the first module 100 and the second module 200 as shorter blanking intervals 220 may be provided. Thus, in the context of wireless seismic data acquisition systems, the data delivery may be accomplished more quickly.

With further reference to FIG. 2A-D, the successive transmission and reception timeslots for the first module 100 and the second module 200 may also be frequency multiplexed. For instance, in FIG. 2A, the data transmitted in transmission period 201 may be transmitted at a first frequency that is then received at the second module 200 during timeslot 202. The second module 200 may be operative to only receive transmissions at the first frequency during this timeslot. Subsequently, the reception timeslot 203 and transmission timeslot 204 may be at a second frequency, such that the first module and second module communicate data by way of transmitting and receiving at the second frequency. This scheme may continue "hopping" frequencies between the various timeslots. It will also be appreciated that the reference time event 223/230 may also use this frequency hopping method of frequency multiplexing. That is, the data transmitted during the time reference event transmission and reception 223/230 may be sent and received at a different transmission frequency than the prior transmission and reception timeslots 222/229 and the subsequent transmission and reception timeslots 224/231. In this way, a plurality of frequencies may be employed to multiplex signals transmitted and received between the two modules.

Turning to FIG. 4, a depiction of a situation wherein a module clock experiences frequency drift 401 is presented. In FIG. 4, time is represented on the horizontal axis while the frequency difference between the module clock and a reference clock is represented on the vertical axis. That is, at time 0, the frequency offset may be 0. In this regard, no time has passed and the module clock is at the same frequency as a reference clock. However, as time passes, the frequency difference between the module clock and the reference clock may increase as depicted by the frequency drift 401. While the amount of frequency drift 401 is shown in FIG. 4 as being linear, it is to be understood that is may not always be true. For instance, the amount of drift may be, but is not limited to a sinusoidal, exponential, random, or discontinuous frequency drift.

The frequency drift 401 whether linear, non-linear or discontinuous, may be periodically corrected by a time reference event 405. In this regard, the frequency of the module clock may be disciplined to the frequency of the reference clock such that the frequency drift 401 goes to zero at the time reference event 405. However, it may be the case that after each time reference events 405, the frequency drift 401 may continue. In this regard, multiple time reference events 405 may occur in order to periodically discipline the module clock. Additionally, with further reference to FIG. 4, it can be appreciated that any frequency drift 401 over time will result in a phase offset 404 that can be represented as the integral of the change in frequency over time. That is, in FIG. 4, the area under the curve of the frequency drift 401 corresponds to a phase offset 404. The phase offset 404 is due to the module clock being at a different frequency than the reference clock for a certain period of time. Stated another way, the frequency drift 401 continually causes a phase offset 404.

In one embodiment, this phase offset 404 may be compensated for when synchronizing the clocks. This may be accomplished by determining the total phase offset 404 by calculating or approximating the phase offset 404 as a function of the change in frequency over time. The phase offset 404 may be represented by the integral of the curve of frequency drift 401 over time. This value is then used to manipulate the phase of the clock of the module. In one embodiment, this manipulation may occur in the module controller to adjust the phase of the module clock.

In FIG. 5, an alternate embodiment of a system where a time reference event is used to correct a frequency offset 501 of a module is represented as a graph. In FIG. 5, the time reference event 505 may compensates for the phase offset 501 such that rather than synchronizing the frequencies of the module clock and the reference clock, the frequency of the module clock is set such that at some time after the time reference event 505 the frequency drift 501 will continue such that the module clock and reference clock will be in synchronization. In this regard, the phase offsets 504 may partially or fully cancel such that the compensation returns the phase offset to 0 at some time after the reference time event 505. This results from the positive offset of the phase being negated by the negative offset of the phase. As such, fewer reference time events 505 may be used without the module experiencing a sustained offset of the module clock's phase with respect to the reference clock. Additionally, in the embodiment of FIG. 5, the phase of the clock may be corrected at each time reference event 505. Again, this may be accomplished by determining a phase offset 504 as function of the change in frequency over time and modifying the phase of the module clock in response to the determined phase offset 504.

Figure 7:
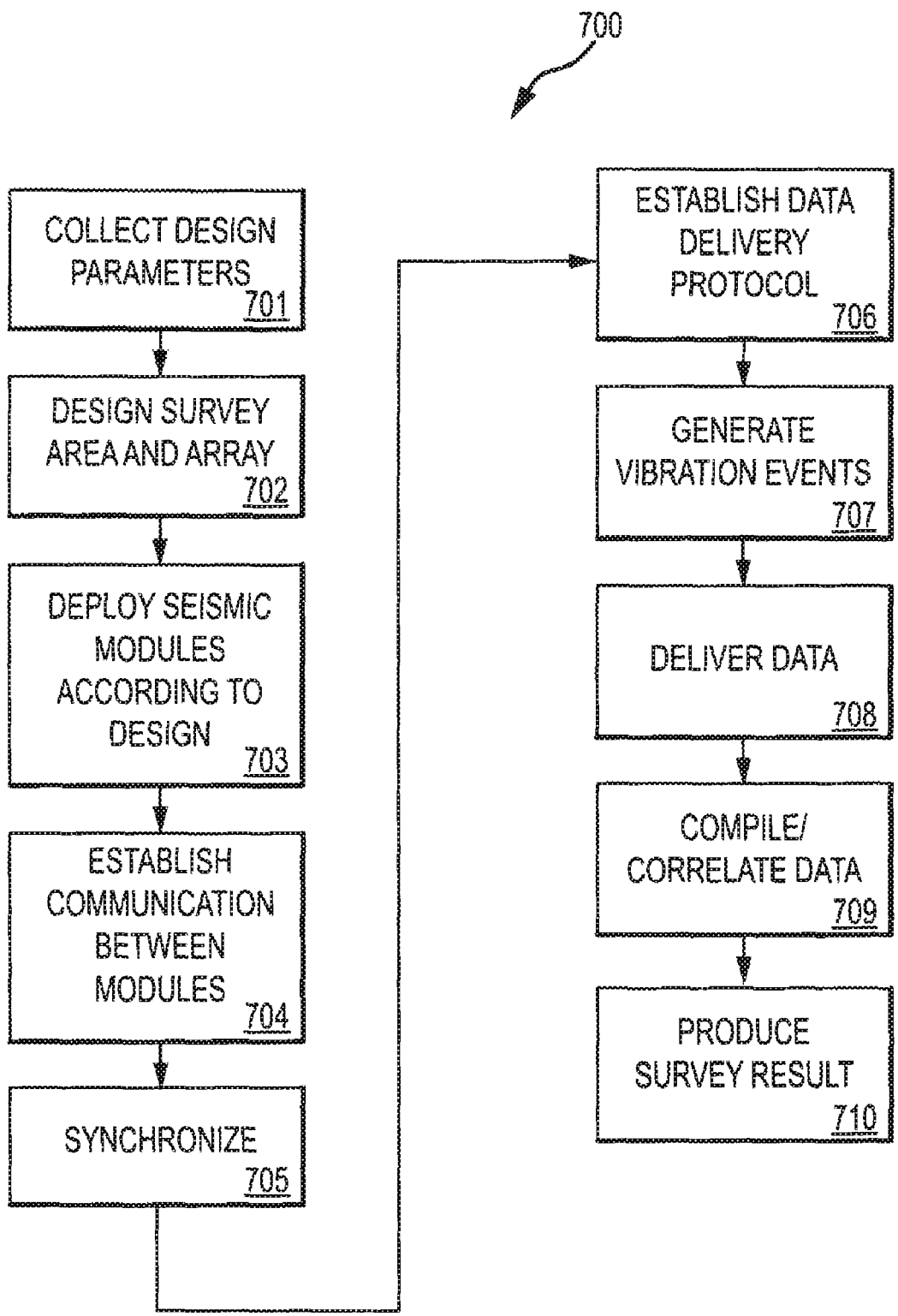
FIG. 7 is a flow chart depicting an embodiment of a process to design and implement a wireless seismic data acquisition system.

It may be appreciated that while the present invention has potential applicability in a multitude of wireless systems, one particular application of the present invention may enable synchronization of a wireless data acquisition system. As discussed above, synchronization of wireless data acquisition modules in a seismic survey may have potential benefits including, but not limited to, increased bandwidth between modules, improved data correlation, and the ability to design seismic surveys with more dense coverage or that cover a wider area. FIG. 7 illustrates one embodiment of a process involving the design and implementation of a wireless seismic data acquisition system.

The process of FIG. 7 may begin at 701 wherein design parameters regarding the needs of the seismic survey may be attained. For instance, various parameters for the wireless transfer protocol may be selected to achieve the desired performance (e.g., transmit power, antenna sensitivity, number of channels to use, data transfer rate, etc.). Moreover, other parameters such as the specific geographic area to be surveyed, the desired spacing of the data acquisition modules as well as the number of data acquisition modules may be considered in order to provide the desired resolution of the resulting seismic data. The transmit power and the number of wireless frequencies needed may be selected. Furthermore, the effective data transfer rate may be chosen based on operating characteristics of the vibration source device, as well as transmission duty cycle of the module and link of the serial data transmission lines among other things. It will be appreciated that the examples provided include only a few of the number of various parameters that may be considered when designing a wireless survey system for seismic data acquisition. In any regard, at 702 the parameters collected at 701 are analyzed and used to design a seismic survey in accordance with the requirements as arrived at in 701.

The process may proceed to 703 such that the wireless modules are deployed throughout the seismic survey area to define an array in accord with the design created at 702. As noted above, requirements of the design may result in the array being configured such that the modules are deployed in a rectangular or other shaped array. At 704, communication is established between the wireless modules such that a serial data path is established among the modules. At 705, the modules are synchronized. By way of example, the synchronization may be by way of transmission and reception of reference time of events and corresponding modifications to system clocks in order to discipline module clocks to one another. At 706, a data delivery protocol is established based at least partially on the module clocks that were synchronized at 705. In this regard, the transmission and reception timeslots comprising the data delivery protocol are at least partially controlled by module clocks such that the synchronized module clocks produce a data delivery protocol with minimized blanking intervals such that the bandwidth between modules is maximized.

At 707, vibrations are created in the survey area. This may include producing vibration events by way of any of the means described above or other means known in the art. At 708, the seismic data acquired by the modules in response to the vibration of events of 708 are delivered such them that data may be transmitted to a processing station by way of the serial communication path. The data delivery of 708 may be accomplished by way of the data delivery protocol that was established at 706. In this regard, the data delivery 708 may be accomplished in an expedited manner utilizing the increased bandwidth realized via precise synchronization. As such, the vibration events of 707 may occur rapidly, wherein the data delivery 708 does not impede successive occurrences of the vibration events of 707.

Additionally, at 709 the seismic data acquired by way of the delivery at 708 may be compiled and correlated such that the various data acquired at individual modules may be integrated. Again, by way of the synchronization of 705, the correlation may be more accurate in that metadata associated with the timing of the data may have accurate assumptions based on the synchronized system. In this regard, the compiled and correlated data at 709 may result in an image or other output at 710 that is of higher resolution and higher fidelity. This high-resolution or fidelity is accomplished by way of synchronization at 705 enabling accurate correlation at 709. In this regard, a wireless data acquisition system employing synchronization may allow for more freedom in designing a seismic survey. Furthermore, synchronization may allow for higher bandwidth between modules such that the array has a greater ability to accomplish data delivery. The accurate timing of data allows for accurate compilation and correlation of data resulting in an improved image or read out resulting from the received seismic data.

Figure 6:
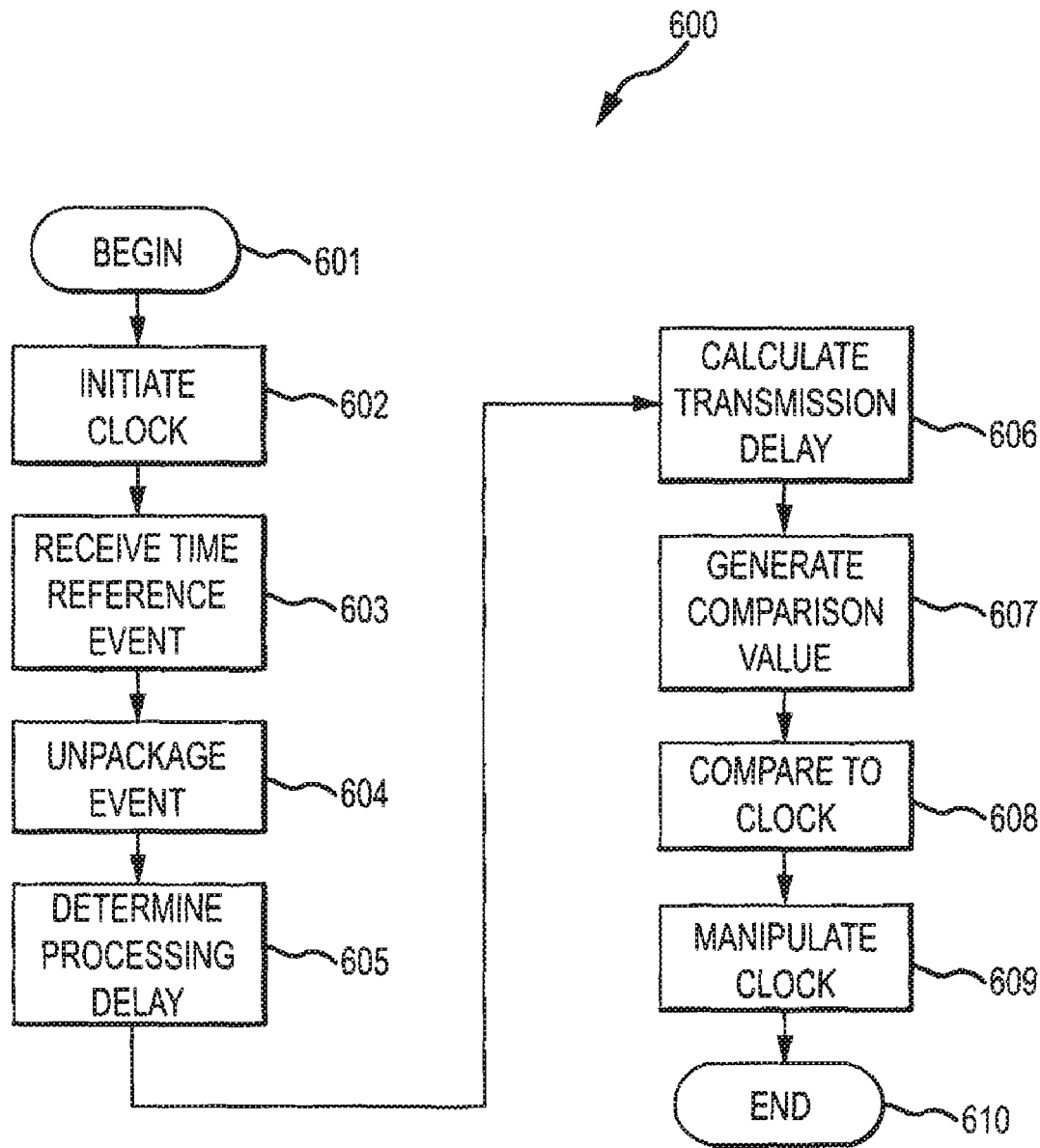
FIG. 6 is a flow chart depicting one embodiment of a synchronization process according to the present invention.

As explained above, the use of a reference time event may be used to synchronize the clocks of various modules. One process of synchronization is depicted in FIG. 6. This process may begin at 601 and may proceed to 602, wherein the module clock may be initiated. Initialization of the module clock may consist of starting a clock running at the module. This clock may be physical or represented in software. Moreover, a combination of physical and software elements may be used. In one embodiment, the physical component may generate a frequency signal, and the software component uses this frequency signal to increment a clock maintained in the software. The module clock may be made up of two parts; a software managed 1 millisecond unit-clock and a timer-counter. The timer-counter may comprise the hardware component that generates the frequency signal. For example, this frequency signal may be a 16 MHz timing signal. When the timer-counter rolls over, it may generate an interrupt in a microcontroller. The interrupt may then cause the microcontroller to increment the unit-clock by a set value. For instance, the unit-clock may increment by 1 ms with each interrupt generated by the timer-counter.

Continuing with reference to FIG. 6, at 603 a reference time event may be received by the module. The reference time event may be generated by another module or may be generated by a component of the module. In one embodiment, the reference time event may be generated by a second module within the same array as the module to be disciplined. This second module may have the same functionality as the disciplined module, or the second module may have a different functionality. For example, a base station or a second data acquisition module may generate a reference time event. One such instance is an embodiment wherein a module receives a reference time event from a base station. Further still, the reference time event may be received from a module that is tasked solely with generating reference time events.

In any event, the module at 604 may unpackage or interpret the reference time event received at 603. This interpretation may include extracting data relating to the source of the reference time event. This source data may include location data about the source. Additional information, such as the type of module or a module identifier may also be provided in the source data.

The reference time event may include a time stamp from the source clock. At 605, based on the unpackaged data from 604, the module may determine a delay associated with the processing of the event. This may take into consideration processing delays at the source as well as those at the module. These delays may be predefined and stored based on laboratory testing of delays associated with signal processing at each module. At 606, a transmission delay may be calculated. This transmission delay may correspond to the time associated with the travel time of the reference time event from the source to the module. This transmission delay may be calculated for each time reference event or stored in memory if the distance is known and has not changed.

At 607, the processing delays and the transmission delay of the reference time event are considered in generating a comparison value. The comparison value may be used to compare the state of the source clock to that of the module clock. In this regard, the comparison value may be generated by way of adding the processing delay and transmission delay arrived at in 605 and 606, respectively, to the time stamp from the source clock. This comparison value may then be used at 608 to compare the source clock to the module clock.

Accordingly, the module clock may be manipulated at 609 to synchronize the module clock to the source clock. This manipulation of the module clock may involve altering the clock's phase, frequency, or both. Moreover, the manipulation to the clock may be accomplished using software or a change in the status of hardware on the module. As described in more detail below, the master clock may be manipulated or in an alternative embodiment, components generating a timer signal may be manipulated to modify the module clock.

Figure 3:
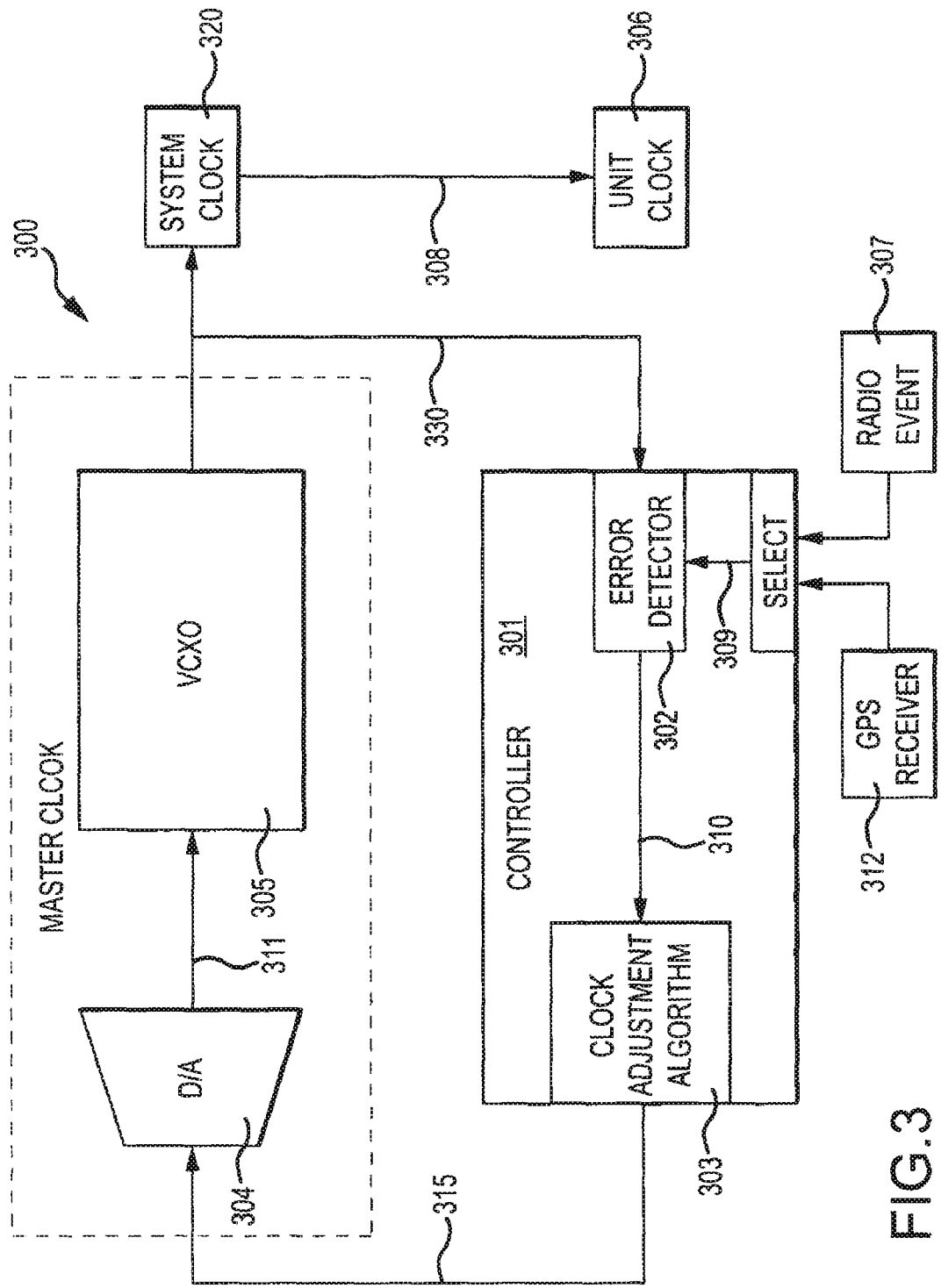
FIG. 3 is a block diagram of one embodiment of a system clock control.

Turning to FIG. 3, a block diagram of one embodiment of a system clock control 300 is shown. The system clock control 300 may allow for disciplining of a module clock to a reference clock without the use of a constantly running resource such as a GPS receiver. The system clock control 300 may include a controller 301. The controller 301 may be a single integrated circuit with various support functions supported by the controller 301. For instance, the controller 301 may include a processor, an oscillator, a timer, I/O capability, and memory. The memory on the controller 301 may be ROM memory or RAM memory. Additionally, the controller 301 may have an error detector 302. The error detector 302 may be used in conjunction with a voltage controlled oscillator. By way of example, the voltage controlled oscillator may be a voltage controlled crystal oscillator (VCXO) 305. In this regard, the VCXO 305 may produce a timer signal 330 in the range of about 16 MHz. This timer signal 330 may be provided to the error detector 302 as well as the system clock 320. The system clock 320 may be operative to generate an interrupt that increments the system clock 320 in 1 millisecond increments. A clock signal 308 may then be relayed from the system clock 320 to a unit clock 306. The system clock 320 may be used to coordinate transmission, blanking interval, and reception timeslots of the transceiver as described in FIGS. 2A-D. The system clock 320 may be a separate unit from the unit clock 306 such that the system clock provides a clock signal 308 to the unit clock, or the two may comprise a single unit such that the system clock 320 also comprises the unit clock 306. For instance, the unit clock may be used to drive software subsystems of the module while the system clock may be used to drive timing subsystems of the module. However, in any regard it will be understood that as the system clock 320 receives a timing signal from the controllable VXCO 305, it may be synchronized at least in part by controlling the VXCO 305. Additionally, as the unit clock 306 is derived from the system clock 320, the unit clock 306 will also be synchronized upon synchronizing of the system clock 320.

Additionally, the error detector 302 may be in communication with a clock adjustment module 303. In turn, the clock adjustment module 303 may be in communication with a digital to analog (D/A) converter 304. The D/A converter 304 may provide a control voltage 311 to the VCXO 305 in order to modify the frequency at which the VCXO 305 oscillates. In this regard, the controller 301 may have the ability to control the output frequency of the VCXO 305 such that the frequency of the system clock may be adjusted. Also, the controller 301 may be capable of receiving a reference signal 309 from a reference clock (e.g., of a GPS receiver 312 or from a radio event 307).

In operation, the system clock control 300 may be used to discipline the system clock 320 to a reference clock (e.g., of a GPS receiver 312 or a radio event 307). The VCXO 305 begins operation at a certain frequency. By way of example, that frequency may be roughly 16 MHz. The VCXO 305 in turn may provide a timer signal 330 at the operating frequency (that may include a signal component that is a derivative or multiple of the oscillatory frequency of the VCXO 305) to the error detector 302. Additionally, the VCXO 305 provides a timer signal 330 to the system clock 320. The system clock 320 may then use the timer signal 330 to increment time intervals and in turn coordinate various functions of the module dependent on a time value, such as, but not limited to, data acquisition, communication, or other various module functions. The system clock 320 may in turn provide the unit clock 306 with a clock signal 308 that may be used to coordinate various synchronous functions of other subsystems. In any regard, the synchronization of the system clock 320 may in turn synchronize the unit clock 306 in that the unit clock 306 is derived from the system clock 320.

The system clock control 300 may continue to operate in this manner until the receipt of a reference time event in the form of a reference signal 309 from a reference clock. In one embodiment, the reference clock may be a clock disciplined to GPS time by way of a GPS receiver 312. The reference signal 309 may contain data relating to a reference time event generated by the reference clock. In addition, this reference signal 309 may contain metadata such as where the reference signal 309 originated, the source of origination, location information regarding the source, or other information. The reference time event and metadata associated therewith enable the error detector 302 to process the reference time event to generate a comparison time that may be compared to the system clock 320. For instance, the reference clock may generate a reference time event at time $t_r$=0.00. Delays may be associated with the reference clock processing the reference time event, transmission delays between the reference clock and the controller 301, and processing time within the controller 301. These delays may be measured and compensated for the by error detector 302, such that the error detector 302 may determine an adjustment to the reference time event ($t_r$=0.00) in order to compare it to the actual time of the module to determine any error in the system clock 320.

By way of example, it may be known that device of the reference clock, from the time the reference time event is measured, takes $t_p$=0.01 to process the signal and relay it to a transmitter to transmit the reference signal 309. Furthermore, it may be known that from the time the reference signal 309 is received by the module's receiver until the error detector 302 generates the comparison time takes $t_p$=0.02. Furthermore, metadata in the reference signal 309 may include data associated with the reference clock such that the distance between the module and the reference clock 307 may be calculated. This distance may be used to calculate a delay (e.g., a medium delay) associated with the transmission time of the reference signal 309. These compensation values (e.g., the medium delay and processing delays) may then be used to generate a comparison value. In other words, it may be known that delays of $t_p$=0.01 and $t_p$=0.02 are associated with processing prior to transmission and after receipt of the reference signal 309. Furthermore, it may be calculated, based on the distance between the reference clock and the module, that the signal took $t_m$=0.04 to be transmitted from the reference clock to the module. As such, the reference time event $r_r$=0.00 would be processed by the error detector 302, taking into consideration the delays, and a comparison time $t_c$=0.07 (i.e., $t_r+t_p+t_m$) may be generated. This time value may then be compared to the system clock 306 to determine a clock error 310.

Once the clock error 310 is determined, it may be communicated to a clock adjustment module 303 that may be used to generate a correction signal 315 that may be communicated to the D/A converter 304. The correction signal 315 may then cause the D/A converter 304 to vary the control voltage 311 of the VCXO 305. This change in the control voltage 311 may then cause the VCXO 305 to alter the frequency at which it oscillates, thereby adjusting the frequency of the VCXO 305 (an in turn the timer signal 330) based on the reference signal 309. In addition, the reference signal 309 and the comparison time generated by the error detector 302 may be compared to the phase of the system clock 320 or unit clock 306 such that the phase of the system clock 320 or unit clock 306 may be adjusted to be in synchronization with the reference clock. As can be appreciated, this embodiment may be used to overcome the phase and frequency discrepancies between two modules as was described with reference to FIG. 2 above.

Moreover, the system clock 320 may be used to generate an outgoing reference signal that is then broadcast to a second module which may in turn perform a corresponding process to the one described above. In this case, the outgoing reference signal is received by another module and corresponds to the reference signal 309 described above, thereby repeating the process described above and disciplining a second clock with the first. This uplink/downlink ability allows the modules in a system to propagate time reference events throughout the system such that all modules within the system have synchronous clocks.

In an alternate embodiment, the system clock control 300 may further include a GPS receiver 312. GPS receivers generally, along with location information, may receive information from GPS satellites that includes a time component. This time component is referred to herein as GPS time. This time component may include a Coordinated Universal Time (UTC) time signal. In any regard, the controller 301 may be operative to interpret a time signal of a GPS timing reference and use this time signal to discipline the system clock 320 as described above. Further, it is noted that operating a GPS receiver 312 increases battery use causing a module constantly employing a GPS receiver 312 to have a lower operative life span than an identical unit not constantly employing a GPS receiver 312. In this regard, it may be desirable to power on the GPS receiver 312 at a first instance, discipline the system clock 320 to the GPS time signal received, and subsequently power off the GPS receiver 312. In one embodiment of the system clock control 300, the system clock 320 is disciplined to GPS time by way of a GPS receiver 312 at startup of the module. Subsequently, the system clock control 300 may employ time reference events 309 received from a radio event 307 to continue to discipline the system clock 320, such that the GPS receiver 312 may remain powered down to conserve battery capacity.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for synchronizing a wireless data acquisition module in a seismic array, the method comprising:
    first receiving at the wireless data acquisition module a time reference event from a separate first component of said seismic array;
    determining a delay value associated with said received time reference event, wherein the delay value includes a transmission delay associated with transmission of the time reference event from the first component to the wireless data acquisition module; and
    adjusting a clock based on the delay value to synchronize the clock in relation to the time reference event.

2. The method of claim 1, wherein the delay value includes a hardware processing delay for the time reference event.

3. The method of claim 1, wherein the reference time event includes clock data from the first component.

4. The method of claim 3, wherein the clock data includes information about a second module clock located remotely from the seismic data acquisition module.

5. The method of claim 3, wherein the reference time event includes source data independent of said clock data, regarding said first component.

6. The method of claim 5, wherein the source data includes location information about a source of the time reference event located remotely from the seismic data acquisition module by a distance.

7. The method of claim 6, wherein the source data is used in the calculation to determine the delay value at least partially based on the distance.

8. The method of claim 1, further comprising:
    generating the reference time event from a known time value.

9. The method of claim 8, wherein the known time value is GPS time.

10. The method of claim 1, further comprising:
    generating a second time reference event; and
    transmitting the second time reference event.

11. The method of claim 1, further comprising:
    second receiving, at said wireless data acquisition module, seismic data from an upstream module at a first time; and
    transmitting, from said wireless data acquisition module, the seismic data to a downstream module at a second time;
    wherein the transmitting and second receiving is coordinated using the clock.

12. The method of claim 1, wherein the adjusting includes changing a frequency of the clock.

13. The method of claim 1, wherein the adjusting includes determining a compensation value to compensate for a time period occurring prior to the adjusting in which the clock was out of synchronization.

14. The method of claim 13, wherein the compensation value is at least partially determined by integrating a frequency differential over the time period.

15. The method of claim 1, wherein the adjusting includes at least one of advancing and regressing the phase of the clock.

16. A method for synchronizing wireless modules used for data delivery in a seismic data acquisition system, the method comprising:
    providing an array comprising a plurality of seismic data acquisition modules that establish a serial data transfer path;
    receiving synchronization metadata at one module from at least one other module of the plurality of seismic data acquisition modules;
    synchronizing a clock of the one module using the synchronization metadata;
    establishing a timed delivery protocol between the plurality of seismic data acquisition modules implemented based on the synchronized clocks, wherein the timed delivery protocol includes time division multiplexed data transmission, and wherein the time division multiplexed data transmission is controlled at least partially by the clock.

17. The method for synchronization of claim 16, wherein the at least one other module is a base station.

* * * * *